United States Patent
Walrafen

[11] 4,012,147
[45] Mar. 15, 1977

[54] SLIT-LESS SPECTROMETER

[76] Inventor: George Edouard Walrafen, 347 Old Army Road, Basking Ridge, N.J. 07920

[22] Filed: Nov. 6, 1974

[21] Appl. No.: 521,178

[52] U.S. Cl. .............................. 356/98; 350/96 LM; 350/168; 356/75; 356/99; 356/100

[51] Int. Cl.² .......................... G01J 3/10; G01J 3/28

[58] Field of Search ......... 356/75, 80, 81, 96–100, 356/51; 350/168, 96 R, 96 B, 96 LM

[56] References Cited
UNITED STATES PATENTS

| | | | |
|---|---|---|---|
| 2,572,119 | 10/1951 | Dieke | 356/81 |
| 2,706,253 | 4/1955 | Hutchins et al. | 356/51 X |
| 3,191,487 | 6/1965 | Kruythoff et al. | 350/168 |
| 3,449,037 | 6/1969 | Koester | 350/168 X |
| 3,471,214 | 10/1969 | Polanyi | 350/168 X |
| 3,770,350 | 11/1973 | Stone et al. | 356/75 |
| 3,875,422 | 4/1975 | Stolen | 350/96 |

FOREIGN PATENTS OR APPLICATIONS 485,694  10/1953  Italy ..................................... 356/81

OTHER PUBLICATIONS

Loseke et al., Applied Spectroscopy, vol. 25, No. 1, Jan./Feb., 1971, pp. 64–70.
Yamada et al., Spectrochimica Acta., vol. 30A, 1974, p. 295.

*Primary Examiner*—John K. Corbin
*Assistant Examiner*—F. L. Evans

[57] ABSTRACT

The use of an optical fiber for providing a point source of radiation at the entrance of a spectrometer obviates the necessity for an entrance slit at the input end of the device. Improved optical imaging at decreased expense is achieved.

2 Claims, 2 Drawing Figures

SLIT-LESS SPECTROMETER

FIELD OF THE INVENTION

This invention relates to spectrometers.

BACKGROUND OF THE INVENTION

A spectrometer disperses light into different colors, as is well known. In order to achieve a high degree of separation of light of different colors, the optical opening in the dispersing direction typically is made as small as possible to prevent overlapping of colors. Thus, the optical opening along say the horizontal axis of the object plane is small. On the other hand, in order to obtain sufficient light input to the spectrometer, a large optical opening along the vertical (nondispersive) axis is employed. The required optical opening thus is rectangular in shape and is commonly called a slit. Such a slit is characteristic of spectrometers. Typically, the vertical dimension of the slit is 1,000–10,000 times larger than the horizontal dimension.

Unfortunately, the use of a slit in a spectrometer is attended by several problems. First, there is a tradeoff of small slit-width to achieve resolution, against larger slit-width to gain light. Second, slits and the attendant mechanisms for opening and closing them are expensive. The expense arises because any variation in width must be realized equally at all heights, i.e., the width must be the same everywhere. If this is not achieved, resolution is reduced and aberrations are introduced. Normally, two precisely machined, straight slit-jaws are moved to and from one another in a precisely parallel, reproducible, and measurable fashion. This involves precision mechanisms that are costly and require maintenance and replacement.

A further problem arises just from the geometry of the slit. The slit is hardly a point source. Thus, additional optical aberrations are introduced by its use. These aberrations cannot all be avoided. Nevertheless, attempts to minimize then must be and are made. Some of these attempts cause loss of light, and are usually very expensive.

A still further problem results from the operative nature of the slit. A slit acts to aperture or block light. Consequently, a shape mismatch between a source and an associated slit occurs. Even with a narrow laser beam, a slit must block out light in the dispensing direction or the aperturing function fails, i.e., the beam apertures itself. If the beam width is smaller than the slit-width, on the other hand, the slit fails to operate as a slit, and beam vibrations can produce noise. When the beam width is greater than the slit-width, loss of light occurs. It is clear then, that the correct use of a slit must involve loss of light.

For high-resolution operation, a small slit width must be employed. This results in a reduced light level. Also, diffraction patterns are formed and resolution is limited as a consequence.

BRIEF DESCRIPTION OF THE INVENTION

In accordance with the present invention the entrance slit that characterized prior art spectrometers is eliminated and an optical fiber is disposed to operate as a light source at the entrance of the spectrometer. In this instance, all of the light carried by the fiber is directed into the spectrometer and is collected by a detecting element. Aperturing is neither required nor desired. A detecting element, the diameter of which equals the diameter of the fiber conveniently collects all the light from the fiber.

In one embodiment of this invention, a liquid core optical fiber contains material to be analyzed. One end of the fiber is positioned to provide a point source of light at the entrance of a spectrometer, and the other end is subjected to a lasser beam. Disk-shaped images of the fiber end are scanned at the image plane of the spectrometer.

DETAILED DESCRIPTION

Figure 1:
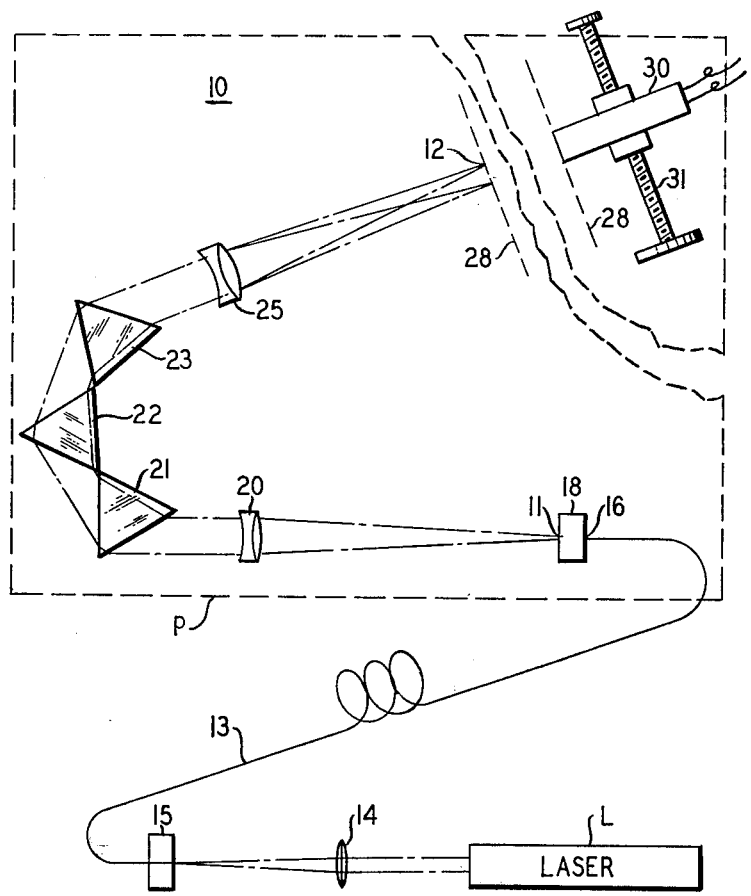
FIG. 1 is a schematic representation of a spectrometer arrangement in accordance with this invention.

FIG. 1 shows a spectrometer 10 having entrance and exit positions 11 and 12, respectively. The entrance position is defined along a rigid plate P, typically a heavy duty steel plate, to which various elements of a spectrometer are affixed in precise locations. In prior art arrangements, a slit-defining element is typically affixed to the entrance position. But in accordance with the present invention, no slit-defining element is so positioned. Instead an optical fiber 13 of the type disclosed, for example, in U.S. Pat. No. 3,770,350 of J. Stone and G. E. Walrafen, issued Nov. 6, 1973 is positioned with its output end at the entrance position. The fiber illustratively has a liquid core (not shown) including the material to be analyzed as disclosed in that patent. Of course alternatively the fiber may have, for example, a solid core and include constituents to be analyzed.

The excitation radiation of a laser L is coupled into the fiber entrance, by means of lens 14 and input coupler 15 of a familiar type. The radiation is coupled out of the exit end 16 of the fiber, and into the spectrometer by means of an output coupler 18. Thus, the coupler 18 is affixed to the steel support plate at the entrance position of a spectrometer to achieve slit-less operation.

In accordance with this invention, radiation from the optical fiber is directed at (achromatic) lens 20 in the absence of the entrance slit characteristic of prior art spectrometers. The parallel rays from the lens are directed illustratively via prisms 21, 22, and 23 to a converging acromatic lens 25 which focuses the images of the end of the fiber in the image plane 28.

Scanning apparatus, shown at the exit position 12 is translatable along the image plane in the dispersive direction to collect the light for selected frequencies in a well known manner. In one embodiment, the scanning apparatus includes a detector photomultiplier 30 and a screw mechanism 31 in a configuration such that the detector photosurface moves in the image plane. In this embodiment, the diameter of the light-responsive surface is ideally the same as that of fiber 13. In an alternative arrangement, the photo-multiplier may be maintained in a fixed position. In the latter instance, an optical fiber of a diameter equal to that of fiber 13 is moved in the image plane, instead of the detector, and the fiber is coupled to the fixed-position detector. Here, the photosurface of the detector may be relatively large depending on the mode of coupling between the fiber and the detector.

The various elements of the spectrometer bear fixed relationships to one another resulting in chromatically variant images of the input being formed along the image plane, displaced in that plane according to the frequency associated with the image. The shape of the image is determined at the entrance plane by the geometry of the fiber 13 end. Specifically, the fiber end at coupler 18 defines the geometry of the source in the object plane herein, operating to direct all of the light in the system directly at lens 20 in the absence of an occluding entrance slit. Coupler 18 is conveniently affixed to the spectrometer at the entrance position to allow the fiber end to be positioned in the object plane. This is in contradistinction to having additional external lenses operative to focus radiation from a fiber onto an entrance slit of a spectrometer, as was common in the prior art.

Figure 2:
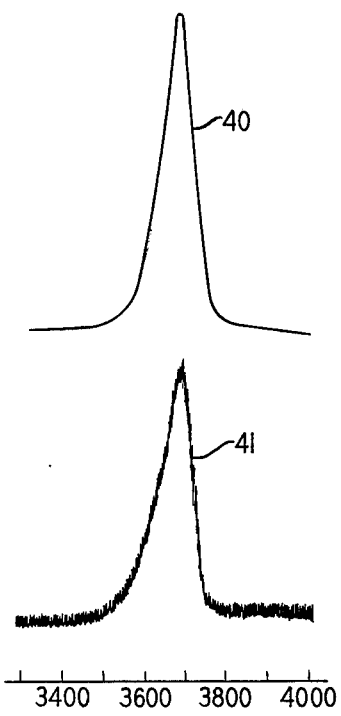
FIG. 2 is a graph of radiation intensity versus frequency for a typical example in accordance with this invention compared to corresponding prior art results.

Not only is an expensive element (the entrance slit-defining arrangement) eliminated from a spectrometer in accordance with the invention, but also improved results are achieved. FIG. 2 shows an illustrative graphical representation 40 corresponding to the Raman radiation in the OH-stretching region from a 0.1 percent (by weight) water impurity in a solid Suprasil-1 fiber 85 meters in length. The spectrum was obtained by focusing 480 mW of 476.5 nm argon-ion laser radiation into one end of the fiber (180 micrometer diameter), and by collecting the Raman radiation from the other end — which is the actual entrance light source for the spectrometer.

The Raman-intensity maximum evident from the figure occurs at a frequency shifts of $3685 \pm 5$ cm$^{-1}$, and the peak-to-peak signal-to-noise ratio is estimated to be about 230 at the maximum. The current measured at the peak was $7.2 \times 10^{-7}$ amperes, when 1300 volts were applied to an uncooled (S-20 response) photomultiplier tube. A picoammeter was employed as the amplifier in conjunction with a fast recorder, and a high-voltage power supply. The experimental apparatus included an exit slit, the width of which was 150 micrometers. The signal-to-noise ratio and the peak current are representative of those usually obtained for the 0.1 percent H$_2$O impurity, but much higher (double) signal-to-noise ratios were obtained in a few cases. A rise-time of 0.1 sec and a scanning rate of about 1.5 cm$^{-1}$ sec$^{-1}$ were employed for all spectra. The OH-stretching peak obtained with the slit-less, optical-fiber, laser-Raman spectrometer is observed to be highly asymmetric. This asymmetry is real and it was possible to verify it with a Cary model-82 spectrometer. This type of spectrometer has a conventional slit system and the signal-to-noise ratio obtained with it was about 20 times smaller than that obtained with a slit-less system. Curve 41 in FIG. 2 represents the Raman radiation obtained with a conventional slit system. Considerably reduced signal-to-noise ratio is obtained as is represented by the spread in the intensity at each frequency in curve 41. The vertical axis in FIG. 2 is intensity in arbitrary units — full scale and the improved signal-to-noise ratio is clear from a comparison of curve 40 with 41.

The noise in the conventional slit system represented by curve 41 arises from the fact that a slit in a spectrograph is not a self-luminous source, that is, it must be illuminated by condensing light on it. In addition when light is condensed on a slit, and the transmitted light is projected on a screen, the image on the screen is a diffraction pattern, that is, it is composed of a bright central region followed on either side by a series of equally spaced regions of decreasing brightness.

When an extremely narrow optical fiber is used in place of a slit in a spectrograph, it approaches very closely the ideal self-luminous point source, (and the ideal self-luminous point source leads to the highest resolving power for a spectrograph having a given camera lens aperature and focal length). Also, when the fiber end is used in placed of a slit, the image that it casts on a screen is related to the mode structure existing within the fiber. That is, if the fiber is very narrow and a single Gaussian mode exists in the fiber, the projected image will be a single bright spot. If higher order modes exist in the fiber, the projected image can have many shapes, such as a ring around a central spot, two concentric rings around this spot, two spots off center, a four leaf clover pattern, etc. These patterns, of course, arise from interference, but the interference occurs within the fiber, and can be controlled by the detailed nature of the fiber and the way in which light is launched into the fiber. In contrast, with a slit, the interference occurs in the passage of light through the slit, to yield a projected diffraction pattern. Mode control of the projected pattern is not possible, with a slit. Ideally, the fiber is chosen of a nature to provide a single bright spot and light is launched into the fiber consistent with the provision of a single bright spot.

What has been described is considered merely illustrative of the principles of this invention. Therefore, various modifications can be devised by workers skilled in the art in accordance with those principles within the spirit and scope of this invention as encompassed by the following claims:

What is claimed is:

1. A spectrometer arrangement comprising a rigid support member and optical means affixed thereto for defining an optical path between an object plane and an image plane, said arrangement being adapted for receiving an optical fiber including core constituents and having a first end of diameter d, said arrangement including means including an optical fiber coupler cooperative with said fiber for providing at said first end a source of visible radiation of diameter d including spectral components characteristic of said constituents in said object plane, optical means for forming said radiation into a beam of parallel rays, means operative upon said beam to produce a plurality of dispersed chromatically variant images of said source each representative of a different one of said spectral components, (and) detection means for detecting the energy density of each of said images, said detection means having a light-receiving surface of about diameter d located in said image plane and means for moving said light-receiving surface from one of said images to another.

2. A spectrometer in accordance with claim 1 wherein said beam of parallel rays has a diameter greater than $d$, said spectrometer also including a lens for focusing said beam in said image plane.

* * * * *